June 7, 1949.　　　　J. H. GIESEN　　　　2,472,103
MODIFIED BONE SCREW HOLDER FOR SURGICAL DRILLS
Filed March 13, 1945

Inventor
JOSEF H. GIESEN
By Ralph L. Chappell
Attorney

Patented June 7, 1949

2,472,103

UNITED STATES PATENT OFFICE

2,472,103

MODIFIED BONE SCREW HOLDER FOR SURGICAL DRILLS

Josef H. Giesen, United States Navy

Application March 13, 1945, Serial No. 582,476

1 Claim. (Cl. 145—52)

(Granted under the act of March 3, 1883, as amended April 30, 1928; 370 O. G. 757)

This invention relates to novel bone screws and means for inserting bone screws of various types into bone structure by the aid of a surgical drill, preferably of the ratchet drill handle type such as disclosed in my copending application S. N. 573,616, filed January 19, 1945, now Patent No. 2,439,803, granted April 20, 1948. More particularly, it has to do with an attachment for the surgical drill whereby the screw head or screw shank may be firmly held in position during insertion into a bone structure. It also relates to a modification of the Sherman and other screws to be used with this attachment, whereby the use of drills may be eliminated for boring bones preparatory to the insertion of the screws, the modified screws being provided with a drill tip so that the drilling and setting operation may be all done at one time.

One of the objects of this invention is to provide means for stabilizing and firmly supporting a bone screw during its insertion into a bone structure by the use of a surgical drill.

Another object is to construct an attachment including a screwdriver shank for insertion in a chuck of a surgical drill, whereby a screw may be firmly held by a pair of jaws attached to said shank while it is being inserted into any hard substance.

A further object is to provide an adjustable device adaptable to be attached to a surgical or other drill whereby a screw might be adjustably held by any part of its shank portion up to a point immediately under its head, while a screwdriver tip is applied to the head during the insertion operation.

A further object is to modify the common bone screws by providing their tips with a short drill portion and a short tap-like portion tapering into the full size thread on the rest of the screw shank.

Other and more specific objects of this device will become apparent as the detailed description thereof proceeds, having reference to the accompanying drawings, wherein.

Figure 1:
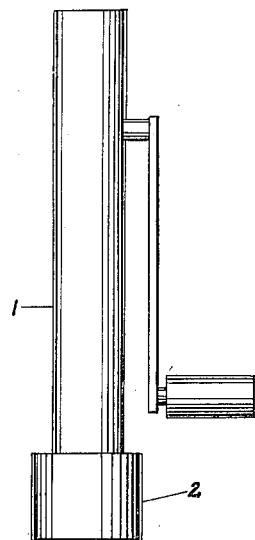
Fig. 1 illustrates one form of the present device, for purposes of illustration, as it may be applied to a bone screw being inserted through a fragment of a fracture for the purpose of securing a bone plate thereto.

Referring to the drawings, the drill 1 has a Jacobs chuck 2 in which the illustrated form of the present device is held. The device comprises a screwdriver shank 3 which is threaded from its tip for any suitable distance up its shank. An inwardly and outwardly threaded sleeve 4 is threadedly mounted thereon. This sleeve has a cross-arm 5 in which the two jaw levers 6 and 7 are pivotally mounted at 8 and 9, respectively. The lower arms of these jaw levers may be suitably formed to afford a good grip over the threaded shank of the screw. The upper arms are beveled at 10 and 11 to fit the tapered portion 12 of an adjustable nut 13 threaded on the sleeve 4.

Thus, by adjusting the nut 13 downwardly on the sleeve 4, the jaw levers are forced in a direction to bring the jaws closer together so that they may firmly grip the screw shank 14, while the screw head 15 is pushed up against the screwdriver tip 16 which may be previously adjusted to any position axially with respect to the jaws by adjustment of the sleeve 4 on the threaded shank 17 of the screwdriver. The bone screw is shown inserted through a screw hole in the bone plate 18 after which it has been screwed nearly through the fragment 19 of the fractured bone. Other screws 20, 21 and 22 are shown already inserted in place.

Figure 4:
Fig. 4 is an enlarged side elevation of the end of a special bone penetrating screw which is used in one embodiment of the present invention.
Figure 5:
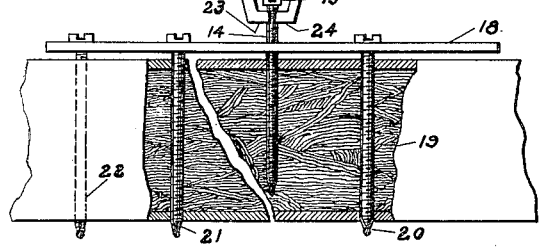
Fig. 5 is an end view of the special screw illustrated in Fig. 4.

It will be well to note that most bone structures have an exterior portion which is very hard and it is ordinarily very difficult to start a screw into them. Usually, the bone structure is first drilled and the bone screw is then inserted. In the drilling operation there is often danger of burning the tissues by running the drill at too high a speed. The result is prolonged and inferior healing as well as poor anchorage. By using the present device and modified bone screws, such as shown in Figs. 4 and 5, in combination with a surgical drill with a ratchet drill handle, such, e. g., as disclosed in my copending application previously referred to, the process of inserting bone screws is much simplified, shortens the time of the operation and assures a neat, safe and firm insertion which is positively controlled. No danger of burning exists because the gear ratio of my drill may be set very low, and the ratchet drill handle affords convenient step by step operation from otherwise inaccessible positions.

As shown in Figs. 4 and 5, the tip of the bone screw is not the ordinary blunt nosed tip, but is provided with a short drill portion 28 followed by a short tap-like portion 29 tapering into the full size thread of the screw shank 27.

The advantages of the use of an attachment such as illustrated here is at once obvious when it is observed that by its use the screw may be firmly held by the jaws applied to some point near the end of the screw shank, while the screwdriver blade is screwed out sufficiently to permit the head of the screw to be placed up high in the device. The head of the screw is manually held against the tip of the screwdriver prior to applying pressure to the jaws over the screw shank by turning down the nut 12, so that the screw is then firmly held in the device and is guided by the position of the drill from then on. The screw is then turned as a unit together with the device and the chuck which holds it. As the screw enters the bone structure, the device may be adjusted from time to time, so that its jaws grip the screw shank higher and higher, until just before the finishing turns the jaw is clearly up against the underside of the screw head. The inserting operation may then be completed by withdrawing the jaws entirely and screwing up the sleeve 4 together with the jaws so as to permit the jaws to clear the top of the screw head. The ends of the jaws 23 and 24 should be as short as possible, consistent with the largest screw head sizes to be used, so that the device will be as narrow as possible at the jaws and will not interfere with surrounding tissues any more than is necessary.

Figure 2:
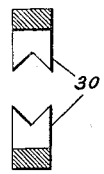
Fig. 2 shows one form of jaws which might be used in this device.

In Fig. 2 the ends of these jaws are shown with V-shaped notches 30. However, these notches may take any suitable form which will permit a firm grip on the screw shank and will prevent slipping therefrom.

Figure 3:
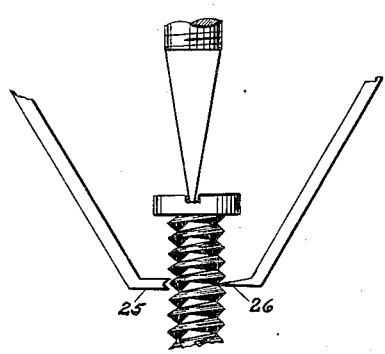
Fig. 3 is another form of jaws having the same notched shape in plan as the jaws of Fig. 2.

Fig. 3 illustrates a form of jaws which are more adaptable for fitting a single thread screw such as most bone screws have on their shanks. It will be noted that the end 25 has a notch in its tip which is V-shaped in the axial direction, whereas the end 26 has a tip in which the axial section is single-pointed. This is so in order to be able to grip the shank of a single threaded screw regardless of its size by straddling the thread on one side of the screw while gripping the groove on the other side thereof which is directly opposite thereto. The overall thickness of the notched end of the jaws may be made very thin so that it will not project appreciably axially beyond the pointed end.

It will be noted that by turning the sleeve 4 on the screw-driver shaft, long or short bone screws may be accommodated.

Many changes in form and dimensions of the several parts of this device may be made without departing from the spirit and scope of this invention as defined in the appended claims.

The invention herein described and claimed may be manufactured and used by or for the Government of the United States of America for governmental purposes without the payment of any royalties thereon or therefor.

What is claimed is:

In a screw holder and driver for use with a drill chuck, a shank having one end for mounting in said drill chuck and having a screw driver blade on the other end, said shank having a threaded portion intermediate its ends, an internally and externally threaded sleeve adjustably mounted on said threaded portion and having a cross-arm, a pair of levers having jaws at one end thereof pivotally mounted on the opposite ends of said arm, a knurled nut threaded on and adjustable on said sleeve and having means for pivoting said levers to move the jaws towards each other, one of the jaws having a single groove transversely thereof and the other of the jaws being pointed so as to threadedly engage with a single convolution of thread of the threaded portion of the screw shank whereby threaded axial movement of the jaws along the shank of the screw is permitted but axial slippage of the jaws is prevented.

JOSEF H. GIESEN.

REFERENCES CITED

The following references are of record in the file of this patent:

UNITED STATES PATENTS

| Number | Name | Date |
|---|---|---|
| 604,250 | Jocelyn | May 17, 1898 |
| 1,116,532 | Armstrong | Nov. 10, 1914 |
| 1,424,600 | Solop | Aug. 1, 1922 |
| 1,754,739 | Calvert | Apr. 15, 1930 |
| 2,121,193 | Hanicke | June 21, 1938 |
| 2,292,657 | Priest | Aug. 11, 1942 |
| 2,381,597 | Johnson | Aug. 7, 1945 |